United States Patent [19]
Plenge

[11] Patent Number: 5,717,754
[45] Date of Patent: Feb. 10, 1998

[54] SANITARY TELEPHONE HANDSET SHROUD

[76] Inventor: Robert H. Plenge, 14706 War Admiral, San Antonio, Tex. 78248

[21] Appl. No.: 685,709

[22] Filed: Jul. 24, 1996

[51] Int. Cl.⁶ .................................................. H04M 1/00
[52] U.S. Cl. .................................. 379/452; 379/439
[58] Field of Search ........................ 379/452, 439, 379/451, 447; D14/192, 138, 250, 217

[56] References Cited

U.S. PATENT DOCUMENTS

| | | | |
|---|---|---|---|
| D. 291,306 | 8/1987 | Espinosa | 379/439 |
| D. 317,452 | 6/1991 | Garab | D14/192 |
| 4,953,567 | 9/1990 | Ward | 379/452 |
| 4,964,161 | 10/1990 | Trowbridge, Jr. | 379/452 |

*Primary Examiner*—Jack Chiang
*Attorney, Agent, or Firm*—David G. Henry

[57] ABSTRACT

The invention is of an improved telephone handset shroud used to isolate a user from direct contact with telephone handsets in the prevention of infection. The handset shroud includes a card pouch, primarily for encasing pre-paid calling cards, and a notepad for taking notes during or in preparation for placing telephone calls. The preferred embodiment of Applicant's invention is fabricated of a crackle-proof fabric, and one modified embodiment includes a scent agent a portion of which is released each time a notepad sheet is removed by the user.

8 Claims, 1 Drawing Sheet

1
SANITARY TELEPHONE HANDSET SHROUD

BACKGROUND OF THE INVENTION

1. Field of the Invention

Applicant's invention relates to sanitary shields for preventing the transmission of infectious agents from apparatuses to the users of such apparatuses.

2. Background Information

The public consciousness of infectious disease is at the highest level in decades. Regardless of assurances by the scientific community that the HIV virus may not be transmitted by mere social contact, many individuals are cynical of these assurances and are loath to come into physical contact with any "public surface". Such "public surfaces" would include exposed surfaces in public rest rooms, door knobs, and (most relevant to this Application) public telephone handsets.

HIV is not the only root of such concerns. Tuberculosis has recently made a significant resurgence in the U.S., a virus which the medical community can only describe as "HIV-like" has recently surfaced, and un-treatable strains of streptococcus and numerous other antibiotic-resistant bacteria are becoming commonplace.

Particularly for the business traveler who is both germ-conscious and who must routinely use public phones immediately after use by strangers, such as at crowded airports, using public phones can be a source of daily discomfort and concern.

Pouches, shrouds and related items for isolating telephone handsets from their users are known. Examples of prior art devices of this general nature are shown in U.S. Patents issued to Espinosa (U.S. Pat. No. Des. 291,306), Trowbridge, Jr. (U.S. Pat. No. 4,964,161), Ward (U.S. Pat. No. 4,953,567), and Garab (U.S. Pat. No. Des. 317,452). Thus, the concept of shrouding a telephone handset for sanitation concerns is not itself novel.

While the link is not immediately apparent, as will be shown below, the recent proliferation of pre-paid calling cards contributes to a new opportunity to improve on prior sanitary telephone handset shrouds in terms of utility, as well as in transforming such a sanitary device into an attractive marketing tool.

SUMMARY OF THE INVENTION

It is an object of the present invention to provide a novel telephone handset sanitary shroud.

It is another object of the present invention to provide a design for a telephone handset sanitary shroud which lends itself to use as a marketing tool for credit card-like, telephone-related cards.

It is another object of the present invention to provide a design for a telephone handset sanitary shroud which renders it more useful, both in its basis design and materials constituency, but through the addition of features relating to the use of telephones in public.

In satisfaction of these and related objectives, Applicant's present invention provides a novel telephone handset shroud which, from the user's perspective, is more useful than similar devices of the prior art, but from the perspective of purveyors of calling cards and the like, is a potent marketing tool. As will be explained below, one embodiment of Applicant's handset shroud is additionally or alternatively useful to marketers of scented items such as cologne or perfume.

2
BRIEF DESCRIPTION OF THE DRAWINGS

FIG. 1 is a perspective view of the preferred embodiment of Applicant's telephone handset sanitary shroud.

DETAILED DESCRIPTION OF THE PREFERRED EMBODIMENT

Figure 1:
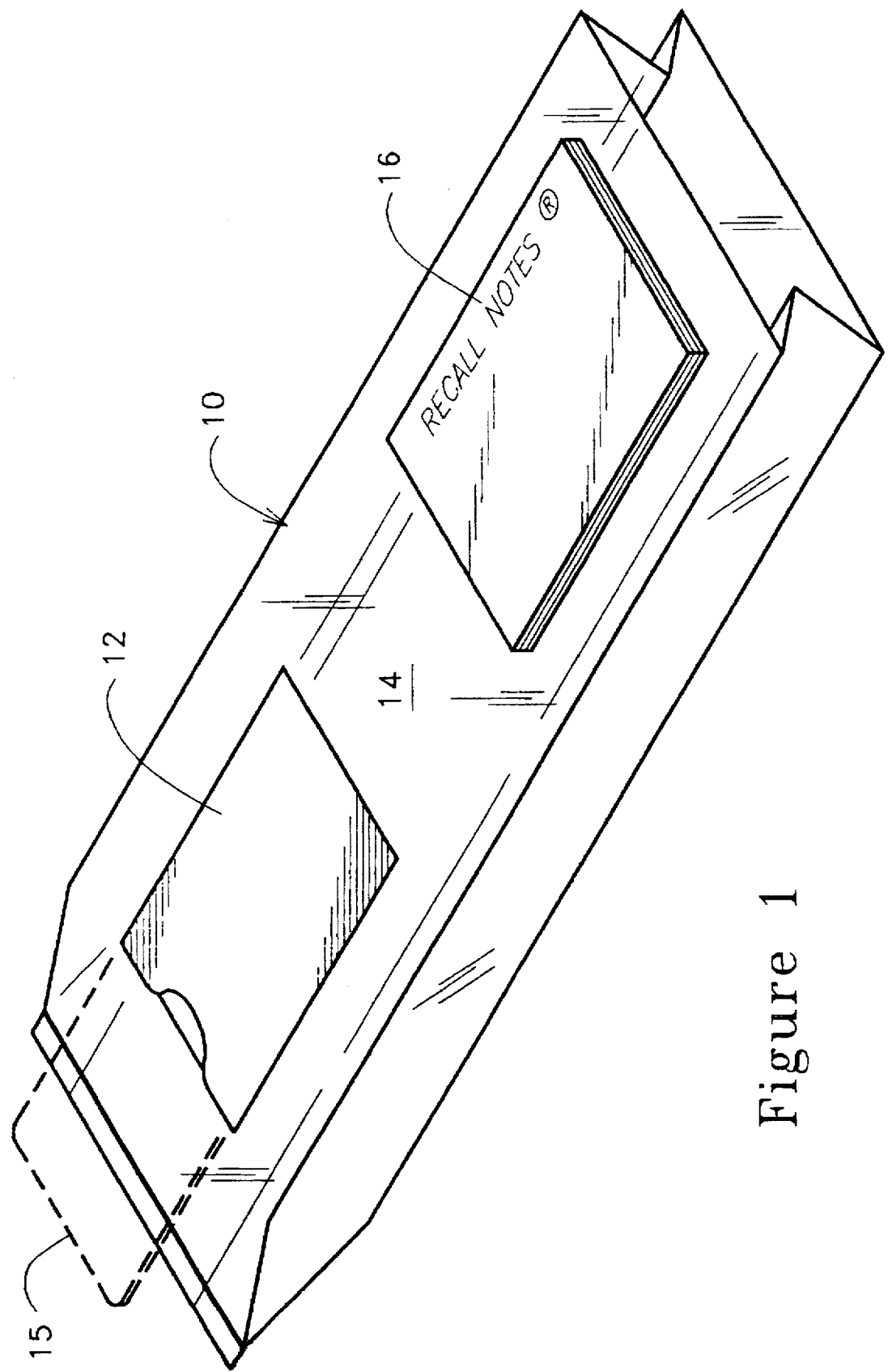

Referring to FIG. 1, Applicant's telephone handset sanitary shroud is identified generally by the reference numeral 10. Shroud 10 is generally of an elongate, pleated sack-like construction and is, in the preferred embodiment, fabricated from disposable, surgical shroud material, such as is used for disposable masks, drapes, hair restraints, shoe enclosures and the like for surgeons and other medical practitioners. One supplier of such material is the Minnesota Mining & Manufacturing Company ("3M") of Minneapolis, Minn. Surgical shroud material is ideal for use in constructing Applicant's handset shroud 10, not only because of its germ-barrier characteristics, but because it does not "crackle" when manipulated. Thus, it will not, when incorporated into Applicant's shroud 10, interfere with telephone conversations. The shroud material also transmits sound rather well, even without perforations (not shown in the drawings) such as are formed through Applicant's shroud 10 in positions to overlie the ear and mouth pieces of standard sized telephone handsets when shroud 10 is placed thereon.

As shown in FIG. 1, a card pouch 12 is affixed to the rearward face 14 of shroud 10. Card pouch 12 is sized and shaped to accommodate an item of standard credit card size and shape. While this feature would be useful to a user of shroud 10 merely to hold card(s) already possessed by the user, Applicant envisions card pouch 12 as holding a pre-paid calling card 15 as it is sold by a calling card vender or distributor. Card pouch 12 can be fabricated of a clear, pliable plastic sheeting material for revealing the face of the calling card, or can be of a non-transparent material on which may be imprinted a logo or advertising script. Applicant envisions the most beneficial use of this embodiment of his shroud 10 being to promote pre-paid calling cards, the lure being that the purchaser will receive both the calling card with its inherent pre-paid long distance convenience as well as an item which is useful in the most likely context for using such a calling card.

An additional feature of Applicant's shroud 12 is the notepad 16. Notepad 16 of the preferred embodiment is an assemblage of notepad sheets which are adhesively bonded along a single margin of the assemblage, the preferred embodiment being a POST-IT notepad (also a 3M product), the rearward most backing of the assemblage being firmly adhered to the shroud 10. An alternative embodiment of Applicant's shroud 10 includes a notepad 16 into which is incorporated a user-activated scent feature. Much like items found in many magazines which involve a removable strip under which is sealingly encased a small measure of perfume or cologne for the reader's evaluation, Applicant notepad 16, in certain embodiments, will include a scent agent which is mixed with the adhesive used to bond the individual sheets of notepad 16 to each other. As each sheet of the notepad 16 is removed, a small measure of scent material is exposed for release into the air. This makes using the shroud 10 pleasurable for the user, particularly in many areas, such as crowded airports, when pleasant scents are all too rare. Applicant envisions this enhanced embodiment of shroud 10 as constituting a valuable promotional item for perfume and cologne manufacturers, either in the context of the familiar "gift with purchase" scheme, or as an outright give-away item.

Of course, any vendor of Applicant's handset shroud 10 may choose to incorporate the scent feature, even if completely unrelated to promoting scented products, merely to enhance the appeal of the shroud 10 as a product for direct purchase or to promote ancillary products.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A sanitary telephone receiver shroud comprising:

an elongate, enclosure which has an open end and a closed end, said enclosure defines a first interior space of a size and shape for fully receiving a telephone handset therein during a telephone communication, through said open end, said enclosure having a front outer face and a rear outer face;

a card pouch member affixed to said rear outer face of said enclosure, said pouch defining a second interior space which is closed at three margins of said card pouch member but open at a fourth margin of said card pouch member, said fourth margin of said card pouch member defining a card pouch opening for passing a credit card-sized object into and from said second interior space; and a notepad assemblage affixed to said enclosure adjacent to the card pouch member.

2. The invention of claim 1 wherein said enclosure is fabricated of a fabric which does not produce audible crackling noises when bent, or folded.

3. The invention of claim 2 wherein said fabric is a cellulose-based disposable material used in the fabrication of surgical shrouds.

4. The invention of claim 1 wherein said notepad assemblage comprises a plurality of notepad sheets which are removably affixed to each other in a manner whereby removing an outermost sheet exposes a scent agent which, prior to such removing, is sealingly encased between said outermost sheet and an adjacent innermore sheet.

5. The invention of claim 2 wherein said notepad assemblage comprises a plurality of notepad sheets which are removably affixed to each other in a manner whereby removing an outermost sheet exposes a scent agent which, prior to such removing, is sealingly encased between said outermost sheet and an adjacent innermore sheet.

6. The invention of claim 1 wherein promotional indicia is imprinted on said card pouch.

7. The invention of claim 4 wherein promotional indicia is imprinted on said card pouch.

8. The invention of claim 5 wherein promotional indicia is imprinted on said card pouch.

* * * * *